United States Patent
Profos

(10) Patent No.: US 8,579,450 B2
(45) Date of Patent: Nov. 12, 2013

(54) SIGHTING DEVICE CONTAINING AN ELONGATED BODY MADE FROM LIGHT CONDUCTING OR LIGHT COLLECTING MATERIAL AND COAXIALLY DISPOSED WITH A LIGHT SOURCE

(75) Inventor: Markus Profos, Bern (CH)

(73) Assignee: MB-Microtec Ag, Niederwangen bei Bern (CH)

( * ) Notice: Subject to any disclaimer, the term of this patent is extended or adjusted under 35 U.S.C. 154(b) by 274 days.

(21) Appl. No.: 12/998,160

(22) PCT Filed: Sep. 22, 2009

(86) PCT No.: PCT/EP2009/006830
§ 371 (c)(1),
(2), (4) Date: Jun. 8, 2011

(87) PCT Pub. No.: WO2010/034458
PCT Pub. Date: Apr. 1, 2010

(65) Prior Publication Data
US 2011/0249428 A1    Oct. 13, 2011

(30) Foreign Application Priority Data
Sep. 24, 2008  (AT) ................................ A 1489/2008

(51) Int. Cl.
*F21V 9/16* (2006.01)
(52) U.S. Cl.
USPC ............................................. 362/84; 42/145
(58) Field of Classification Search
USPC ...................... 362/84; 42/100, 145; 33/241
See application file for complete search history.

(56) References Cited

U.S. PATENT DOCUMENTS

| 4,806,007 A | 2/1989 | Bindon |
| 4,877,324 A | 10/1989 | Hauri et al. |
| 5,862,618 A * | 1/1999 | Brown ............................ 42/145 |
| 6,233,836 B1 * | 5/2001 | Uhlmann et al. ............... 42/145 |
| 2008/0184609 A1 | 8/2008 | Schulst |

FOREIGN PATENT DOCUMENTS

| CH | 667 150 | 9/1988 |
| EP | 0 254 675 | 1/1988 |
| GB | 1 532 090 | 11/1978 |

OTHER PUBLICATIONS

International Search Report in PCT/EP2009/006830, Feb. 16, 2010.

* cited by examiner

*Primary Examiner* — Joseph L Williams
(74) *Attorney, Agent, or Firm* — Collard & Roe, P.C.

(57) ABSTRACT

The invention relates to a sighting device, containing an elongate light source (11) and an elongate body (15) made from a material which conducts light and/or collects light. The light source (11) and body (15) are disposed coaxially. A user looking into the device in the viewing direction (3) sees at least one luminous mark under all light conditions. In weak or failing ambient light, at least the light source (11) appears as a luminous dot and in strong ambient light, the face of the body (15) directed towards the user radiates collected light. In the transition range between weak and strong ambient light, both the light source (11) and the luminous face of the body (15) are visible to the user.

9 Claims, 2 Drawing Sheets

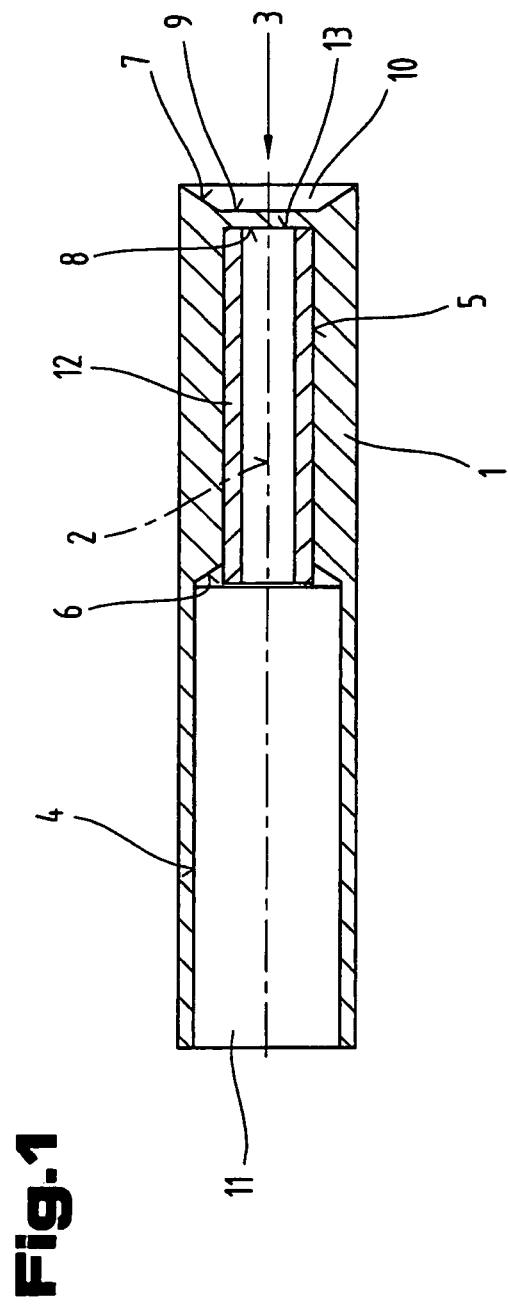

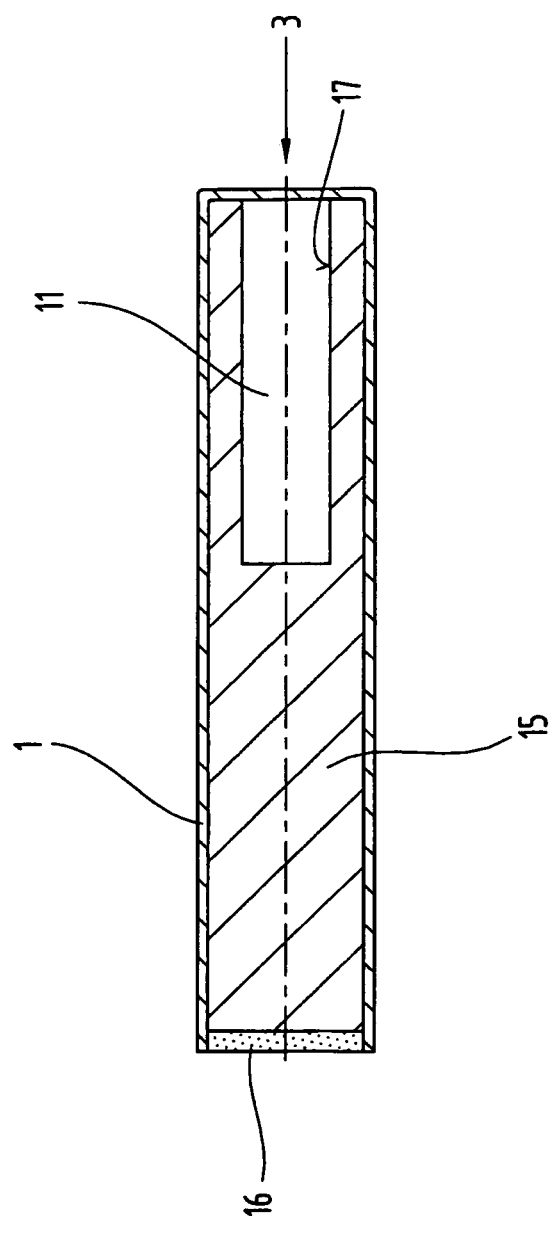

SIGHTING DEVICE CONTAINING AN ELONGATED BODY MADE FROM LIGHT CONDUCTING OR LIGHT COLLECTING MATERIAL AND COAXIALLY DISPOSED WITH A LIGHT SOURCE

CROSS REFERENCE TO RELATED APPLICATIONS

This application is the National Stage of PCT/EP2009/006830 filed on Sep. 22, 2009 which claims priority under 35 U.S.C. §119 of Austrian Application No. A 1489/2008 filed on Sep. 24, 2008, the disclosure of which is incorporated by reference. The international application under PCT article 21(2) was not published in English.

The invention relates to a sighting device for aligning a device connected to the sighting device by aligning the axis of the sighting device with a viewing axis, containing an elongate light source and an elongate body made from a material which conducts light and/or collects light, and the light source and body are disposed coaxially.

Optical sighting devices are used as a means of aligning a device connected to the sighting device by aligning the axis of the sighting device with a viewing axis. Optical sighting devices are used in measuring apparatus, cameras and fire arms, for example. Sighting devices are also used as a means of aligning structures or machines.

Many different types of sighting devices are known. For example, there are sighting devices which are designed exclusively for use during daylight. Other sighting devices are designed for use at dusk or at night, in which case they have an integrated illuminating means.

Most of the sighting devices of the latter type are difficult or even impossible to use in bright ambient light because this ambient light is brighter than the illuminating power of the integrated illuminating means, thus rendering this illuminating means ineffective.

Patent specification CH 6 671 50 A relates to a sighting device with a first cavity with a semi-transparent mirror and a second cavity with a target aligning reticle, a co-operating currentless light source and a deflector mirror for deflecting the illuminated target aligning mark onto the semi-transparent mirror. Imaging optics are disposed in the optical path of the target aligning reticle so that the observer aiming the sight at the target area sees the target aligning reticle in infinity. The target aligning reticle and the light source are disposed in a sight head which can be inserted in and removed from the device housing.

Document GB 1 532 090 A relates to a sighting device with a tubular body 1 made from a material that is impermeable to light. A collimator lens is disposed in the body 1 at one end. Provided at the other end of the body 1 is a transparent body 3, in which a light source 4 is disposed. The transparent body 3 is covered by a disc 11 on its side facing the tube interior. In good light conditions, ambient light directed through the transparent body is visible through an outer peripheral region of the disc, whereas in poor ambient light, the light source 4 is visible as a central dot in the middle of the disc.

Against the background of this prior art, the underlying objective of the invention is to propose a sighting device which is suitable for use under any light conditions, in other words in both bright daylight and at dusk and at night or in dark rooms, which is simple and inexpensive to manufacture and functions reliably.

This objective is achieved by the invention due to the fact that the body is provided in the form of a tube, and a housing is provided surrounding at least a part of the casing surface of the tube, which is made from a transparent material that is different from the material of the tube.

The advantage of this is that the user looking into the sighting device from the end of the tube exactly in the direction of the longitudinal axis sees a section of the light source through the interior of the tube in the form of a central, luminous dot corresponding to the internal cross-section of the tube. This dot is surrounded by two concentric rings, the inner ring corresponding to the end face of the tube and the outer ring being formed by a region of the housing. In weak or failing ambient light, the user sees light from the light source in the outer ring, directed there by the housing, and the inner ring appears darker than the outer one. In strong ambient light, the light directed from the light source axially through the housing is eclipsed by the ambient light. As a result, the inner ring appears bright because the end face of the tube radiates parts of the ambient light picked up by the tube via its casing surface. The user always sees a central, luminous dot and at least one luminous ring concentrically surrounding the dot under all light conditions and when the sighting device is correctly aligned.

The above-mentioned objective may also be achieved by the invention due to the fact that the light source is accommodated in a bore at the end of the body.

However, all variants of the device proposed by the invention have an advantage in that the user looking into the device in the axial direction sees at least one luminous mark under all light conditions. In weak or poor ambient light, at least the light source appears as a luminous dot and in strong ambient light, the face of the body directed towards the user radiates collected light. In the transition range between weak and strong ambient light, both the light source and the luminous face of the body are visible to the user.

Based on one embodiment, the sighting device has a housing which surrounds the body and is transparent at least at the end with the bore. This specifically protects the body against damage such as scratching and prevents dirt from getting in.

Based on one embodiment, the light source is a capsule, which emits light on the basis of radio-luminescence. Such light sources do not need to be supplied with power, such as electrical current, for example, and reliably radiate visible light for a long time.

In the case of another embodiment, molecules which scatter light are embedded in the material of the body. Some of the scattered light is directed to the faces of the body by total reflection so that this light picked up via the surface of the body is emitted in a concentrated manner. In the case of one specific embodiment, this effect is further enhanced if the molecules are fluorescent.

In the case of another embodiment, the material of the body is colored. The visibility of the body can be improved as a result of this feature.

In the case of another embodiment, the color of the body and the color of the light radiated by the light source are different. This ensures that there is a clear differentiation under all light conditions.

In yet another embodiment, the light source and the tube are based on a circular cylindrical design and are disposed coaxially, and the light source has a bigger external diameter than the tube. This design is particularly suitable for aligning the sighting device correctly with a user's line of vision.

In another embodiment, the housing is of a circular cylindrical design and the light source and tube are accommodated in locating bores of the housing, thereby making the sighting device particularly simple and inexpensive to manufacture.

In another embodiment, the bore of the housing accommodating the tube is a blind bore with a flat base disposed at a right angle with respect to the longitudinal axis of the sighting device.

This affords an unobstructed view onto the face of the tube directed towards the user and the wall left between this base and the face of the housing directed towards the user protects the interior of the sighting device from ingress by dirt and moisture.

Based on another embodiment, the transition from the bore for the light source to the bore for the tube has an oblique surface in the form of a truncated cone. This increases the proportion of light radiated by the light source which is able to reach the region of the housing surrounding the tube.

Based on another embodiment, a recess is disposed in the face of the housing adjacent to the tube, which has a circumferentially extending oblique surface in the form of a truncated cone and a central, flat base surface. The diameter of the central base surface preferably corresponds to the external diameter of the tube. As a result, the circular rings of the housing and tube are visually clearly distinguishable from one another to a user looking into the sighting device.

To provide a clearer understanding, the invention will be described in more detail below with reference to examples of embodiments illustrated in the appended drawings.

These are simplified schematic diagrams illustrating the following:

FIG. 1 shows a longitudinal section through a first embodiment of the sighting device;

FIG. 2 is a view of the first embodiment in the viewing direction under poor light conditions;

FIG. 3 is a view of the first embodiment in the viewing direction under good light conditions;

FIG. 4 shows a longitudinal section through a second embodiment of the sighting device.

FIG. 1 is a longitudinal section illustrating an example of an embodiment of the sighting device proposed by the invention. Reference number 1 denotes an elongate housing, which accommodates in its interior other components that will be described below. The housing is preferably of a circular cylindrical design and is made from a translucent, transparent material, for example sapphire. Reference number 2 denotes the longitudinal axis of the sighting device and arrow 3 the viewing direction, in other words the direction in which a user looks through the sighting device. Starting from the left-hand end face of the housing 1 in FIG. 1, the latter has a first cylindrical orifice 4, which extends more or less as far as the longitudinal center of the housing. The base of the first orifice 4 merges into a second, smaller cylindrical orifice 5 with a cone angle. A first oblique surface 6 is formed by the cone angle, which has the shape of an internal face of a truncated cone. The base of the second orifice 5 is disposed close to the right-hand face of the housing 1 in FIG. 1 and is provided in the form of a flat, circular first base surface 8 disposed at a right angle with respect to the longitudinal axis 2. A recess 10 is provided in the right-hand face of the housing 1 in FIG. 1, which is formed by a second oblique surface 7 and a second base surface 9. The second oblique surface 7 has the shape of an internal face of a truncated cone and the second base surface 9 is flat, circular and oriented at a right angle with respect to the longitudinal axis 2. The cone angle of the first oblique surface 6 and the second oblique surface 7 may, but need not necessarily, be identical.

An active light source 11 is accommodated in the first orifice 4. It may comprise a glass tube sealed so as to be airtight, the internal face of which is coated with a luminous material and is filled with gaseous tritium. The electrons emitted by the tritium gas permanently activate the luminous material. Such light sources are available under the name of "Trigalight" from the company MB Microtec of CH-3172 Niederwangen and come in different colors. The light source 11 may be secured in the first orifice 4, for example by adhesive. In the embodiment illustrated as an example here, the light source 11 emits green light.

Inserted in the second orifice 5 is a tube 12, made from a transparent, preferably colored, material. By particular preference, the material of the tube has light-collecting properties. By this is meant that light penetrating the tube via the casing is collected and directed to the end faces, which in this instance are based on the shape of circular rings. Such a material might be polymethyl methacrylate, for example, which is known under the commercial name of Plexiglas and in which molecules which scatter incident light or which fluoresce under the effect of ambient light can be embedded. Due to total reflection, a major part of the emitted light is directed to the end faces 13, from where it is emitted in a concentrated manner. In the embodiment described as an example here, the material of the tube 12 is red in color.

FIG. 2 shows a view of the sighting device in the viewing direction 3 in poor ambient light or total darkness. The light radiated by the light source 11 passes firstly through the cavity of the tube 12 and in this view appears as a green, circular dot 14 with a diameter corresponding to the internal diameter of the tube 12. The dot 14 is surrounded by an annular surface corresponding to the end face 13 of the tube 12. This annular surface 13 is provided with a graticule in this example and therefore appears gray. This illustrates the fact that this annular surface radiates hardly any light in poor or failing ambient light and therefore appears dark. To prevent the annular surface 13 from radiating light which is directed from the light source 11 axially through the wall of the tube 12, the end face of the tube 12 facing the light source 11 may be covered. The annular surface 13 is surrounded by another annular surface in FIG. 2, corresponding to the second oblique surface 7. This other annular surface 7 radiates light which is directed from the light source 11 through the first oblique surface 6, penetrating the material of the housing 1 where it is directed onwards by total reflection and is output at the second oblique surface 7. When the user of the sighting device sees the annular surface 7 and dot 14 exactly concentrically as illustrated in FIG. 2, his eye is looking into the sighting device exactly in the direction of the longitudinal axis 2.

FIG. 3 shows a view of the sighting device in the viewing direction 3 in relatively bright ambient light, for example daylight. The light radiated by the light source 11 passes through the cavity of the tube 12 and also appears as a green circular dot 14 in this view, with a diameter corresponding to the internal diameter of the tube 12. As was the case with the example illustrated in FIG. 2, the dot 14 is surrounded by an annular surface corresponding to the end face of the tube 12. This annular surface 13 appears as luminous red in this example because the plastic material the tube 12 collecting light through the casing surfaces of the housing 1 collects the ambient light penetrating the tube 12 and emits it in concentrated form at the end face 13. This effect can be further enhanced if the end face of the tube 12 facing the light source 11 is provided with a mirror, which throws the light hitting it back through the wall of the tube. The other annular surface which corresponds to the second oblique surface 7 and surrounds the annular surface 13 is provided with a graticule in this example and therefore appears gray. This reflects the fact that this annular surface appears darker in daylight than the red luminous annular surface 13 for example, although light originating from the green light source is naturally also emitted by it, as described above in connection with FIG. 2. When the user of the sighting device sees the annular surface 13 and dot 14 exactly concentrically as illustrated in FIG. 3, his eye is looking through the sighting device exactly in the direction of the longitudinal axis 2.

One particular advantage of the sighting device proposed by the invention resides in the fact that it can be used seamlessly under all light conditions. The dot 14 is readily visible under all light conditions because it corresponds to the direct view onto the light source 11 and is of a different color than the annular surface 13 immediately surrounding it. Under good light conditions, the annular surface 13 is readily visible due to the light radiated by it and is illuminated all the more brightly, the stronger the ambient light is. Under poor light conditions, especially if the ambient light is weaker than the light radiated by the light source 11, the outer annular surface 7 is clearly visible. Even if the latter is the same color as the dot 14, it is clearly distinguishable from the dot 14 due to the annular surface 13 of a different color lying in between.

Possible dimensions of the sighting device are as follows, for example. The housing 1 may have a diameter of 5 mm and a length of 25 mm. The light source 11 may have a diameter of 4 mm and a length of 13 mm. The tube 12 may have an external diameter of 2.5 and an internal diameter von 1.5 mm. These dimensions are given purely as examples and are not intended to restrict the scope of the patent in any way.

By contrast with the housing 1 described above and illustrated as an example in the drawings, the latter may be made from the specified transparent material in only the region surrounding the tube 12. The region of the housing surrounding the light source 11 may be made from a different material or in the extreme case dispensed with altogether. In principle, the second oblique surface 7 can be dispensed with because the end-face region of the housing 1 between the external diameter of the housing and the external diameter of the tube 12 would nevertheless appear as an annular surface as illustrated in the end-on view shown in FIG. 2. However, the oblique surface 7 delimits this annular surface more sharply. The second orifice 5 need not necessarily be a blind bore as illustrated and may be an end-to-end bore instead, in which case the end face of the tube 12 may be offset from the end face of the housing, disposed flush with it or project out from it. However, the design illustrated makes it easier to completely seal the housing, thereby protecting it against ingress by substances such as dirt and moisture.

The geometric shapes described are particularly effective in terms of aligning the longitudinal axis 2 of the sighting device with the viewing direction of a user. However, the housing 1, light source 11 and tube 12 need not necessarily be circular and it would be conceivable to opt for other cross-sectional shapes instead provided the sighting device fulfils its purpose.

FIG. 4 illustrates a particularly simple embodiment of the device proposed by the invention. Disposed in a housing 1, in this instance a glass tube, is a body 15 made from a material which conducts light and/or collects light. Again in this example, reference number 3 denotes the viewing direction. The body 15 has a bore 17 in the right-hand face in FIG. 4, in which a light source 11 is accommodated. At the oppositely lying end, on the left in the drawing, the housing is tightly sealed by a closure 16, for example made by casting with silicone. By contrast with the embodiment described as an example above, the example illustrated in FIG. 4 does not exhibit any parallax effect due to an axial offset between the end face of the light source 11 directed towards the user and the body 15 if the user is not looking into the sighting device exactly in the axial direction. Consequently, this embodiment is less suitable for applications requiring high precision sighting. On the other hand, it is easier and less expensive to manufacture.

As mentioned above, the sighting device proposed by the invention lends itself to numerous applications. In the case of firearms, a sighting device proposed by the invention can be used in the form of a front sight and deployed in a manner similar to a diopter.

For the sake of good order, finally, it should be pointed out that, in order to provide a clearer understanding of the sighting device, it and its constituent parts are illustrated to a certain extent out of scale and/or on an enlarged scale and/or on a reduced scale.

LIST OF REFERENCE NUMBERS

1 Housing
2 Longitudinal axis
3 Viewing direction
4 First orifice
5 Second orifice
6 First oblique surface
7 Second oblique surface
8 First base surface
9 Second base surface
10 Recess
11 Light source
12 Tube
13 End face of 12
14 Dot
15 Body
16 Closure
17 Bore

The invention claimed is:

1. Sighting device for aligning a device connected to the sighting device by aligning the axis of the sighting device with a viewing axis, containing an elongate light source (11), which is a capsule emitting light on the basis of radio-luminescence in the form of a glass tube sealed so as to be airtight, which is coated with a luminous material on the internal face and filled with gaseous tritium, and an elongate body (12, 15) made from a material which conducts light and/or collects light, and the light source and body are disposed coaxially, wherein the body is provided in the form of a tube (12), and a housing (1) is provided surrounding at least a part of the casing surface of the tube (12) which is made from a transparent material that is different from the material of the tube (12) and the light source (11) has a bigger external diameter than the tube, and a cutout of the light source (11) in the form of a central illuminating point (14) with a diameter corresponding to the internal cross-section of the tube (12) is visible through the interior of the tube (12), and the tube (12) and the housing (1) direct collected light by total reflection onto their end faces (13; 7) where the light exits so that the central point (14) is surrounded by an annular surface (13) which is surrounded by another annular surface (7), and the annular surfaces (13; 7) correspond to the end faces (13; 7) of the tube (12) and the housing (1), respectively.

2. Sighting device according to claim 1, wherein molecules which scatter light are embedded in the material of the body (12, 15).

3. Sighting device according to claim 2, wherein the molecules are fluorescent.

4. Sighting device according to claim 1, wherein the material of the body (12, 15) is colored.

5. Sighting device according to claim 4, wherein the color of the body (12, 15) and the color of the light radiated by the light source (11) are different.

6. Sighting device according to claim 1, wherein the housing (1) is of a circular cylindrical design and the light source (11) and tube (12) are accommodated in locating bores (4, 5) of the housing (1).

7. Sighting device according to claim 6, wherein the bore (5) of the housing (1) accommodating the tube (12) is a blind bore with a flat base surface (8) disposed at a right angle with respect to the longitudinal axis (2) of the sighting device.

8. Sighting device according to claim 6, wherein the transition from the bore (4) for the light source (11) to the bore (5) for the tube (12) has an oblique surface (6) in the form of a truncated cone.

9. Sighting device according to claim 1, wherein a recess (10) is disposed in the face of the housing (1) adjacent to the tube (12) which has a circumferentially extending oblique surface (6) in the form of a truncated cone and a central, flat base surface (9).

* * * * *

UNITED STATES PATENT AND TRADEMARK OFFICE
CERTIFICATE OF CORRECTION

PATENT NO. : 8,579,450 B2  Page 1 of 1
APPLICATION NO. : 12/998160
DATED : November 12, 2013
INVENTOR(S) : Markus Profos It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 350 days.

Signed and Sealed this
Twenty-second Day of September, 2015

Michelle K. Lee
*Director of the United States Patent and Trademark Office*